E. W. BROADHEAD.
VALVE.
APPLICATION FILED JULY 9, 1914.
1,123,084.
Patented Dec. 29, 1914.
3 SHEETS—SHEET 1.
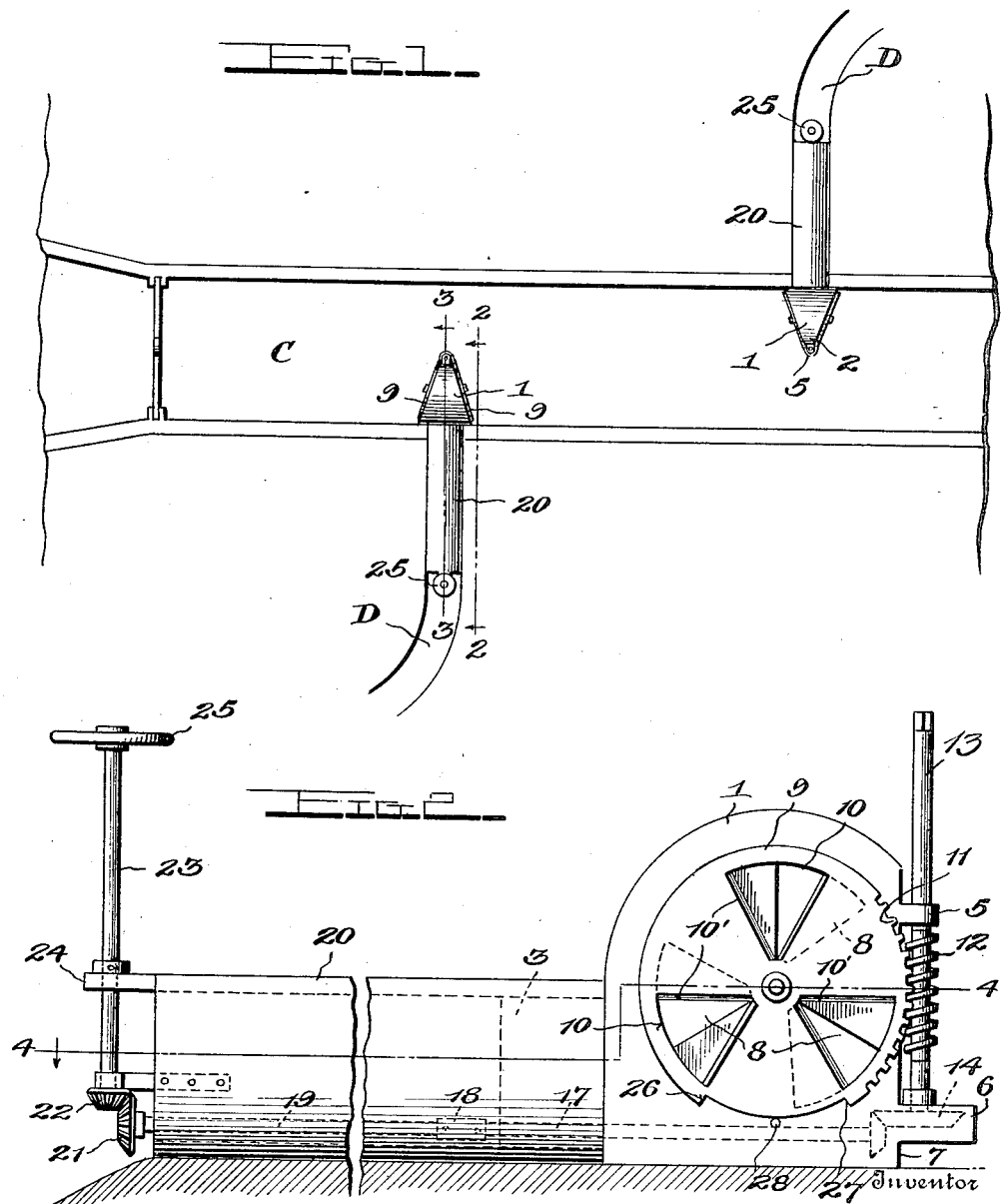
Witnesses
Inventor
Ernest W. Broadhead,
By 
Attorneys E. W. BROADHEAD.
VALVE.
APPLICATION FILED JULY 9, 1914.
1,123,084.
Patented Dec. 29, 1914.
3 SHEETS—SHEET 2.
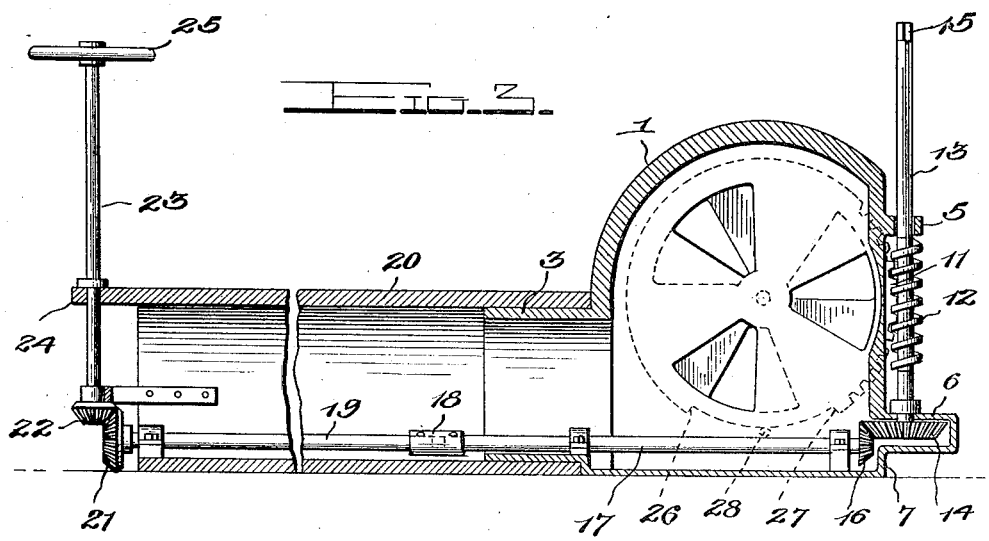
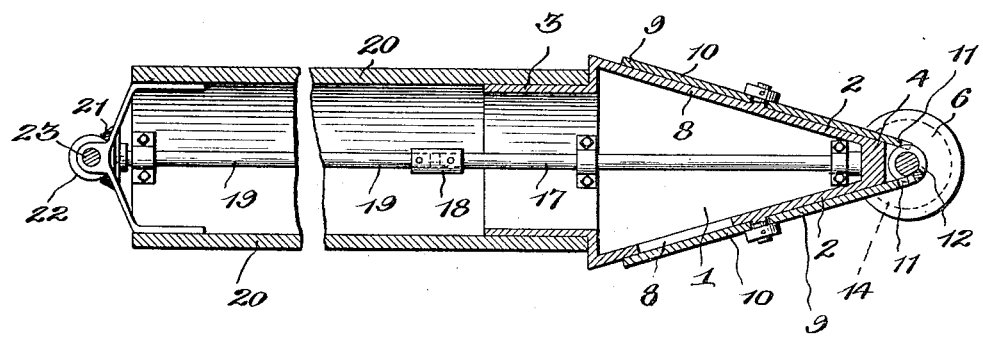
Inventor
Ernest W. Broadhead,
Witnesses

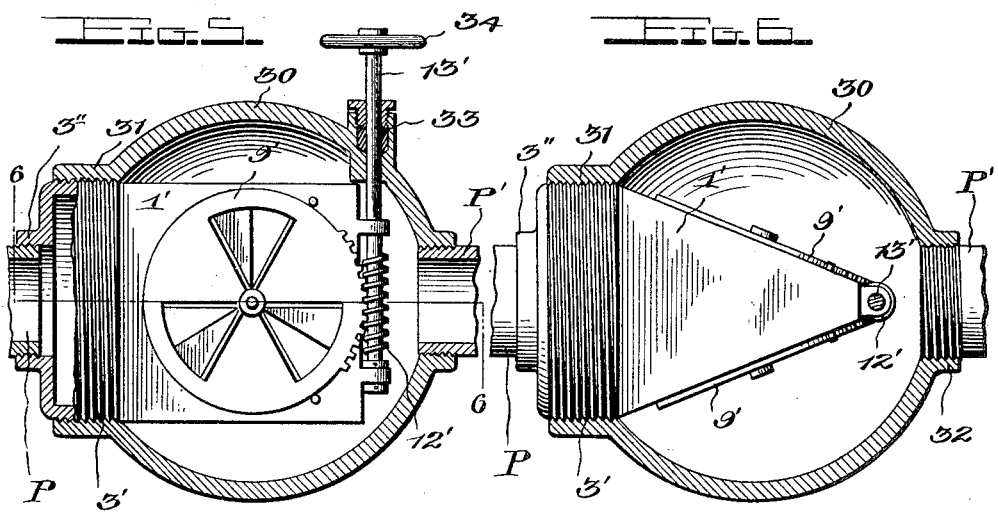
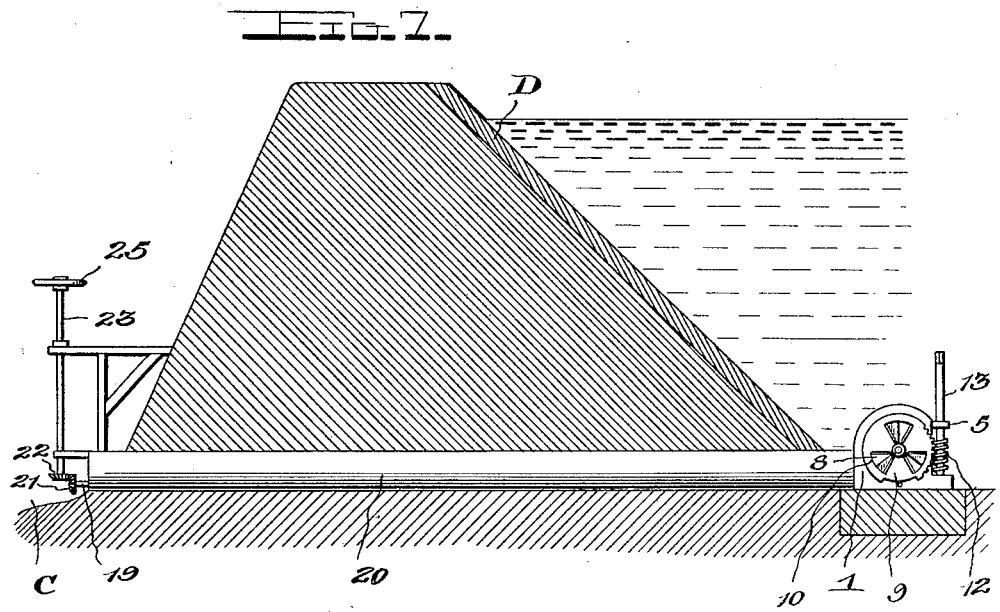

UNITED STATES PATENT OFFICE.

ERNEST W. BROADHEAD, OF MANCOS, COLORADO.

VALVE.

1,123,084.  Specification of Letters Patent.  Patented Dec. 29, 1914.

Application filed July 9, 1914. Serial No. 850,033.

*To all whom it may concern:*

Be it known that I, ERNEST W. BROADHEAD, a citizen of the United States, residing at Mancos, in the county of Montezuma and State of Colorado, have invented certain new and useful Improvements in Valves; and I do declare the following to be a full, clear, and exact description of the invention, such as will enable others skilled in the art to which it appertains to make and use the same.

This invention relates to improvements in valves and has for its primary object to provide a simple and inexpensive device, of the hereinafter described character, which may be used to equal advantage as a head gate, in irrigating ditches or as an efficient shut off for water or steam pipes.

A secondary object is to construct the device in such a manner as to cause the valve disks, to be described, to be securely locked in any one of their adjusted positions.

Still another object is to provide a pair of such disks with but a single operating element, the advantage of two becoming apparent in the following description.

With the above objects in view, the invention resides in certain novel features of construction and combination herein described and claimed and shown in the drawings wherein—

Figure 1 is a plan view of a portion of a feed ditch or canal showing one application of my invention; Fig. 2 is a vertical section on the line 2—2 of Fig. 1 with the disks partially closed; Fig. 3 is a similar view taken on the line 3—3 of Fig. 1; Fig. 4 is a horizontal section on line 4—4 of Fig. 2; Fig. 5 is a vertical section through a globe valve casing showing the application of my invention thereto; Fig. 6 is a horizontal section on the line 6—6 of Fig. 5, and Fig. 7 is a side elevation showing the application of my invention to an irrigating canal and its feeder.

In the first four figures of the accompanying drawings, I have shown my invention as employed in connection with an irrigating system in which C designates the main feed ditch or canal which may lead from any suitable feeder. Extending laterally from the canal C at suitable intervals is a plurality of supplemental ditches D. It is at the junction of the ditches D with the canal C that my improved valve is employed.

Coming now more particularly to the construction of the present invention, the numeral 1 designates a substantially cylindrical casing which is provided with forwardly converging ends 2 and with a rearwardly extending sleeve 3 to which the conduit to be described, is connected. As clearly shown in Figs. 1 and 4, the ends 2 converge and are joined at their forward ends to an upright wall 4, said wall having near its upper end a vertical bearing 5 while a horizontal flange 6 projects forwardly from its lower end. The flange 6 is of greater width than the wall 4 and is continued downwardly outside each end 2 as shown at 7, these provisions being made for a purpose to appear.

Each end 2 is provided with a plurality of inlet openings 8, three being here shown on each side. Journaled at their centers to the center portions of the end walls 2, are circular valve plates or disks 9 each having a number of inlet openings 10 which are adapted to register with the openings 8 in said walls when said disks are rotated.

For the purpose of imparting rotary movement of the disks 9, I provide each of the latter with a series of worm teeth 11 which are adapted to mesh with a worm 12, the latter being rigidly mounted on an upright shaft 13 which is journaled intermediate its ends, within the bearing 5 while its lower end projects through the flange 6, and carries rigidly a bevel gear 14. The upper end of the shaft 13 rises a suitable distance above the bearing 5 and is squared as shown at 15 for the reception of a suitable tool by which it may be turned. As another means of rotating the shaft 13 and the worm 11, I provide a bevel pinion 16 which contacts with the forward side of the continuation 7 of the flange 6 and meshes with the teeth of the bevel gear 14. The pinion 16 is carried rigidly on the forward end of the shaft 17 which extends rearwardly within the casing 1 and the sleeve 3 and is provided, in rear of said sleeve, with a coupling 18. As clearly shown in Fig. 3 the coupling 18 is employed for the purpose of rigidly connecting an operating shaft 19 to the shaft 17, said shaft 19 extending rearwardly through a suitable conduit 20 and having on its outer end a bevel gear 21 with which a bevel pinion 22 is in mesh. The pinion 22 is carried rigidly by the lower end of an upright shaft 23 which is revolubly supported in suitable bearings 24 on the end of said conduit and rises a desirable distance and is provided at its upper end with a hand wheel 25. Thus it will be seen that by rotating the shaft 13, either by the hand wheel 25 or by a suitable tool placed upon its squared portion 15, the two disks 9 will be simultaneously rotated in the same direction to cause the openings 10 to register with the openings 8 and thus establish communication between the canal C and the lateral ditch D or to cause the portion of said disks between the openings 10 to overlie the openings 8 and thereby cut off all communication between said canal and the ditch D.

For the purpose of preventing the rotation of the disks 9 to such an extent as to cause the threads of the worm 12 to disengage the teeth 11, I notch the lower edges of the disks 9 as shown at 26 thereby providing stop shoulders 27 which are adapted to contact with a stop pin 28. It will be clearly seen that this means for limiting the movement of the disks 9 need not be followed too strictly, since any appropriate stops, could be employed.

By the provision of the two disks 9, I am enabled to provide twice as many inlet openings as would be possible if but one disk were employed. Furthermore, I am enabled to make said openings of less area thereby preventing the disks 9 from being greatly weakened. This I consider an important feature of the invention.

The operation of the device, so far described, is as follows:—Assuming that the water supply is cut off from the canal C to the ditch D, and that it becomes necessary to establish communication between the two, the shaft 13 is rotated in the proper direction to cause the worm 12 to rotate the disks 9 in the proper direction for causing the openings 8 and 10 to register. Thus it will be seen that the water from the canal C is free to flow through said registering openings and from the interior of the casing 1 to the ditch D through the circuit 20. It will be clear that the amount of water discharged from the canal C may be varied by rotating the disks 9 to vary the size of the openings through which the water is allowed to discharge. When said disks are rotated to cause the openings 8 and 10 to register throughout their entire areas, water from the canal C will flow through said openings with great force. Were the openings 8, in the opposite end walls 2, in horizontal alinement, the water flowing in one of said openings would retard the movement of the water flowing in the opposite opening. In order to overcome this difficulty, I arrange said openings in staggered relation. In other words, the openings 8, in one end wall 2, are opposite the material between the openings in the opposite end wall. By this positioning, when water flows into the openings in either end, it will contact with the end wall on the opposite end of the casing and will thus be deflected rearwardly and will consequently fall and flow through the conduit 20 and into the ditch D.

In Figs. 5 and 6, I have shown my valve used in connection with a pair of steam or water pipes P and P'. In this application of the invention, the casing 1' is suitably shaped, the sleeve 3' is enlarged and externally threaded and the shaft 17 and the parts carried thereby are omitted. The sleeve 3' is reduced at its outer end as at 3" and internally threaded for the reception of the pipe P. The casing 1', when used in this connection is surrounded by a globular casing 30 which is provided with bosses 31 and 32 for the reception of the sleeve 3' and pipe P' and with a stuffing box 33 through which the shaft 13' carrying the worm 12' is revolubly passed. It will be noted that, since there is no function for the bevel gear 14 when the device is used in this connection, said bevel gear is also omitted and that the upper end of the shaft 13' is provided with a hand wheel 34 for use in rotating said worm to adjust the disks 9'.

In Fig. 7, I have illustrated the application of my invention to an irrigating canal and its feeder, the latter including the usual dam D through which the conduit 20 passes and communicates with the canal C, the entire valve structure being submerged in said feeder. In this application of the invention, the valve plates are operated by the hand wheel 25 and the connections from said wheel to said plates although it will be understood that the worm shaft could be continued upwardly and employed for the above purpose.

From the foregoing description, taken in connection with the accompanying drawings, it is thought that the construction and operation of the invention will be readily understood without requiring a more extended explanation.

It may here be stated that when the disks are rotated to cover the openings in the end walls of the casing, a great deal of mud and sediment may be deposited upon the ends of said casing. In order to prevent said mud and sediment from retarding the operation of said disks, I bevel the side walls of each opening 10 as shown at 10'. Thus it will be seen that sharp cutting edges are formed which will effectually remove any deposits upon said end walls.

Although I have described my invention with considerable minuteness, and have illustrated but three applications thereof, I do not wish to be limited to minor details of construction or to the herein described applications of the invention otherwise than as specified in the appended claims.

Before setting forth the claims in my invention, it may be well to more clearly explain some of the many advantages resulting from a device constructed in accordance with my invention. The valve being at the bottom of the reservoir and being operated by a stem running through the conduit does away with the use of a tower in the reservoir and cannot be in any way affected by the expansion or contraction due to the freezing or thawing of the water. The device is likewise protected from floating ice and is so positioned as to allow the operator to readily view the amount of water allowed to pass through the valve. The device may be quickly, easily and inexpensively installed into any reservoir conduit and possesses other advantages too numerous to be herein set forth.

Having thus described my invention, what I claim as new and desire to secure by United States Letters Patent is:

1. A valve comprising a casing having a pair of converging walls, each being provided with inlet openings, the openings in one wall being disposed in staggered relation to those in the opposite wall, an outlet from said casing and means for closing said openings.

2. A valve comprising a casing having a pair of converging walls, each being provided with inlet openings, the openings in one wall being disposed in staggered relation to those in the opposite wall, an outlet from said casing, an apertured disk revolubly mounted in contact with each of said walls, worm teeth on the peripheries of said disks, a worm revolubly mounted at the narrow end of said casing and in mesh with the teeth on each disk and means for rotating said worm, whereby, said disks will be moved in unison to cover or uncover the openings in said walls.

3. A valve comprising a substantially cylindrical casing having converging end walls each provided with inlet openings, a discharge passage from said casing, an apertured disk revolubly mounted upon the exterior of each of said end walls, worm teeth and stops on the peripheries of said disks, an upright shaft journaled at the narrow side of said casing, a worm on said shaft and in mesh with said worm teeth, a bevel gear on the lower end of said shaft, a bevel pinion in mesh therewith, a horizontal shaft projecting rigidly from said pinion and into the interior of said casing, means for rotating said horizontal shaft to rotate said worm, and a stop on said casing adapted to coact with the stops on said disks to limit the movement thereof.

4. A valve comprising a casing having a pair of converging walls and an outlet opposite the narrow end of said casing, said walls having inlet openings, the openings in one wall being located in staggered relation to the openings of the other wall, and independent valve plates for closing and opening said inlet openings.

In testimony whereof I have hereunto set my hand in presence of two subscribing witnesses.

ERNEST W. BROADHEAD.

Witnesses:
 JOHN F. BAUER,
 W. E. DAVIS.

Copies of this patent may be obtained for five cents each, by addressing the "Commissioner of Patents, Washington, D. C."